Dec. 26, 1967     P. J. JESSEN ET AL     3,359,642
GAGE FOR INDICATING PARALLELISM OR NON-PARALLELISM
OF ELEMENTS OF A DISC BRAKE
Filed March 14, 1966     2 Sheets-Sheet 1
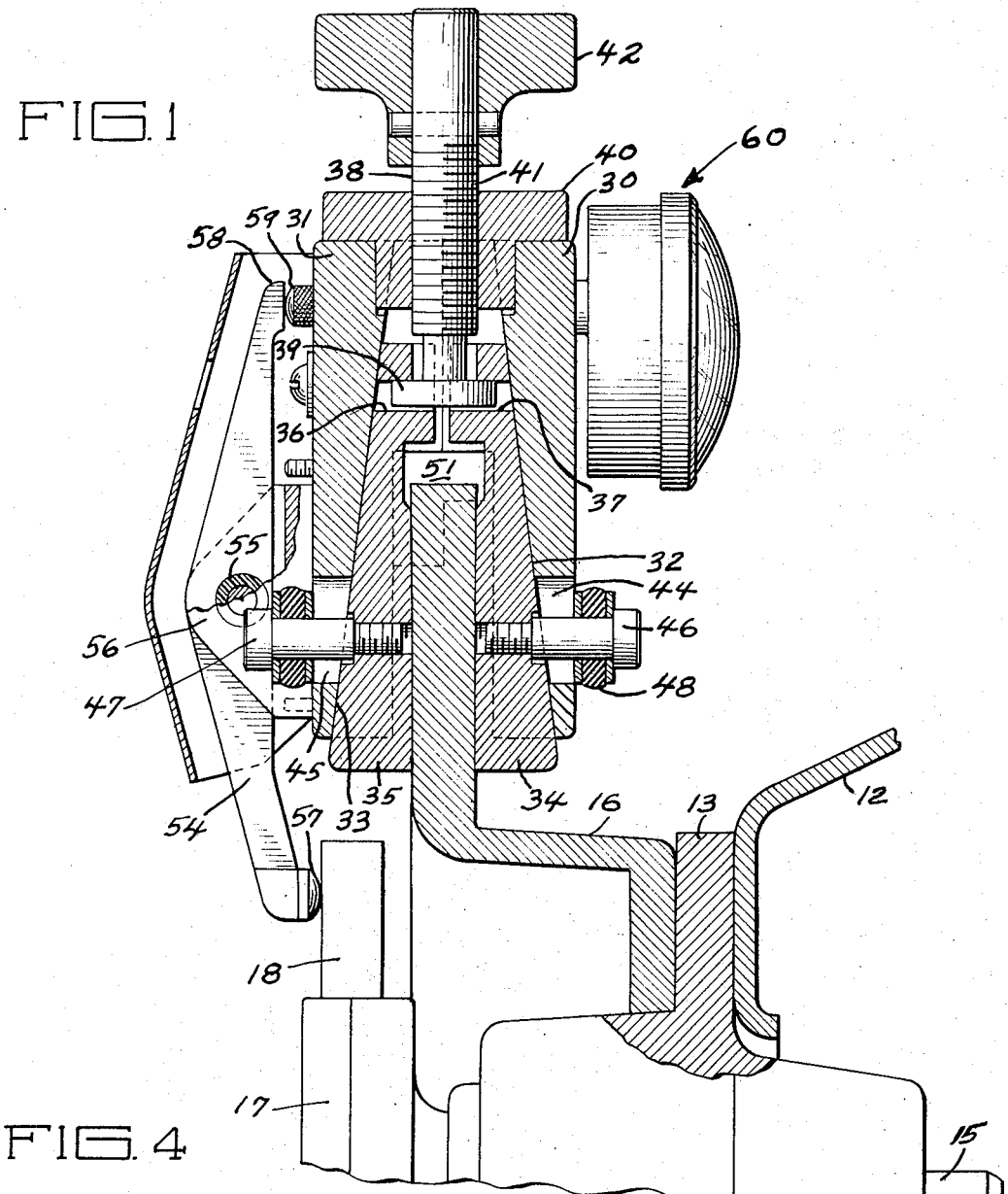
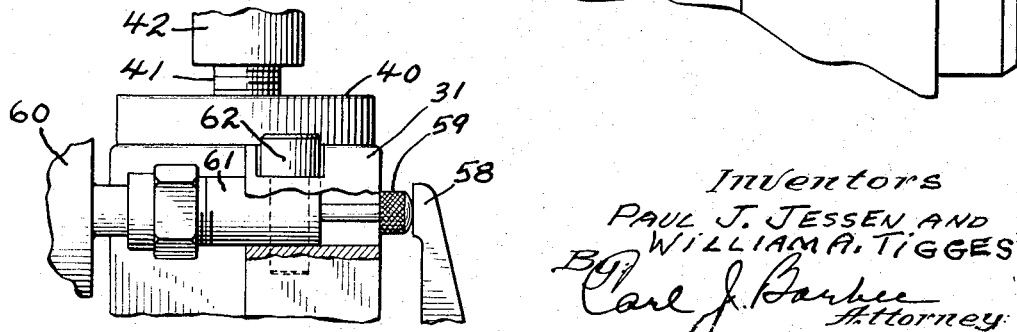
Inventors
PAUL J. JESSEN AND
WILLIAM A. TIGGES
By Carl J. Barbee
Attorney Dec. 26, 1967    P. J. JESSEN ET AL    3,359,642
GAGE FOR INDICATING PARALLELISM OR NON-PARALLELISM
OF ELEMENTS OF A DISC BRAKE
Filed March 14, 1966    2 Sheets-Sheet 2
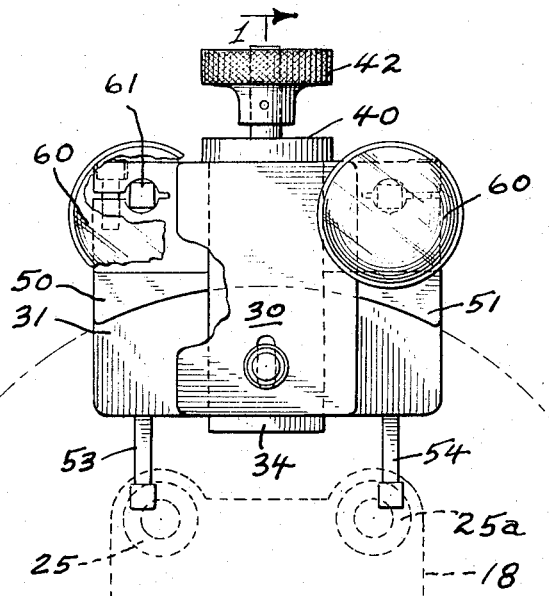
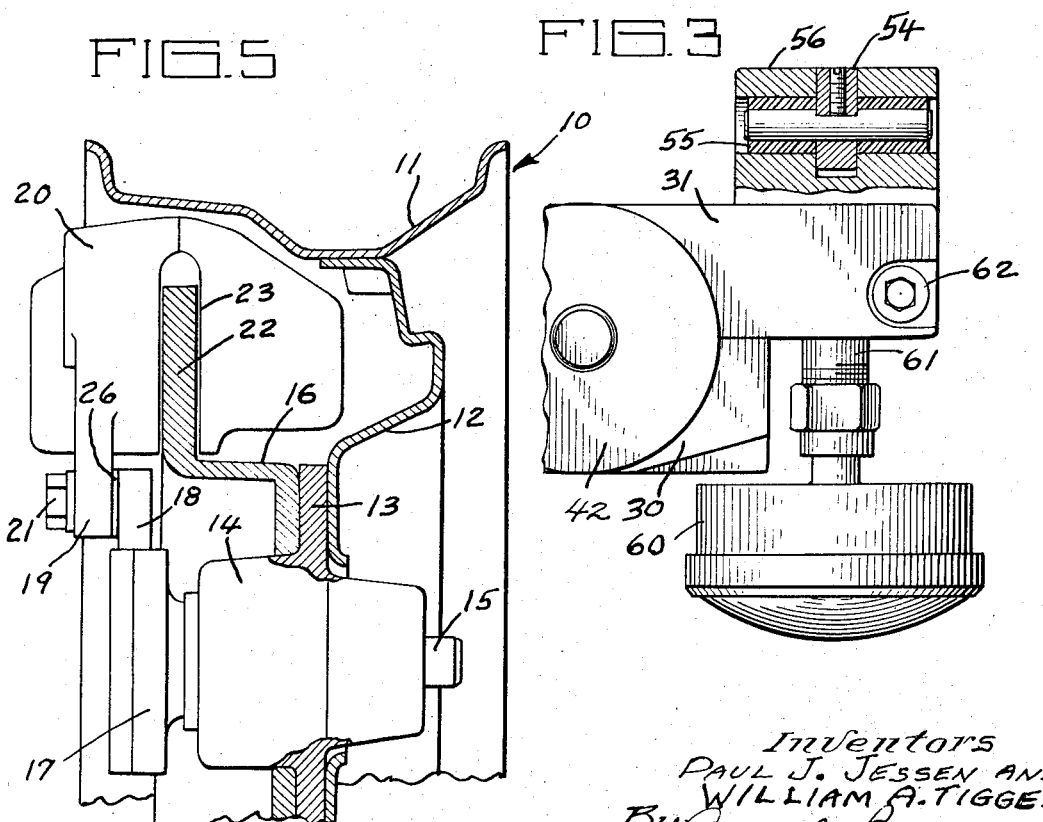
Inventors
PAUL J. JESSEN AND
WILLIAM A. TIGGES
By Carl J. Barbee
Attorney

United States Patent Office 3,359,642
Patented Dec. 26, 1967

3,359,642
GAGE FOR INDICATING PARALLELISM OR NON-PARALLELISM OF ELEMENTS OF A DISC BRAKE
Paul J. Jessen, Kenosha, and William A. Tigges, Racine, Wis., assignors to American Motors Corporation, Kenosha, Wis., a corporation of Maryland
Filed Mar. 14, 1966, Ser. No. 533,916
6 Claims. (Cl. 33—181)

ABSTRACT OF THE DISCLOSURE

The invention has reference to a gage for performing a double function in connection with the assembling of a disc brake assembly relative to a vehicle wheel. The disc element of the brake assembly needs to be in a condition of parallelism relative to the mounting surface of the stationary support for the disc and the center plane of the disc needs to be the correct distance from the mounting surface. The gage performs the aforementioned functions simultaneously so that appropriate shims can be used for making necessary corrections.

---

The invention relates to a gage for indicating parallelism or non-parallelism of a rotative disc with reference to the mounting surface of a stationary support for the disc.

The gage also indicates the thickness of shims needed to correct non-parallelism and also the thickness of shims needed to establish the correct distance from the center plane of the disc to the mounting surface of the stationary support.

The principal object of the invention, then, is to provide a gage for accomplishing the aforementioned functions.

A specific object of the invention is to provide in a gage of the type hereinbefore described an assemblage which assures an accurate reading each time the gage is used.

Other objects and advantages of the invention will be apparent from the ensuing specification and appended drawings in which:

FIGURE 1 is a sectional view of the gage being used in checking the disc of a disc type vehicle brake with reference to the mounting pad, said view being taken on the line 1—1 of FIGURE 2.

FIGURE 2 is a side elevational view, with parts broken in section, on a reduced scale of the gage shown in FIGURE 1 and with the brake disc and mounting pad shown in dotted lines.

FIGURE 3 is a fragmentary plan view of the gage shown partly in section.

FIGURE 4 is a fragmentary end view showing a portion of the gage with parts broken in section.

FIGURE 5 is a fragmentary view of a vehicle wheel and associated disc type brake shown partly in section.

Referring briefly to FIGURE 5, there is shown a vehicle wheel 10 including rim portion 11 anchored to the central portion 12 which in turn is anchored to the hub flange 13. The hub 14 is rotatably carried on the stationary wheel spindle 15 and the brake disc 16 is also anchored to the hub flange 13 so as to be rotatable along with the wheel and hub. The wheel supporting spindle includes an enlarged bracket portion 17 which includes at its upper end a mounting pad 18 to which the downwardly depending tongue portion 19 of the brake caliper 20 is anchored by means of bolts 21. Suitable braking pads or shoes (not shown) are mounted within the brake caliper housing on either side of the circular disc 22 for engaging the opposite side faces of said disc during the braking operation.

It is important that the disc 22 be positioned within caliper slot 23 so that its side faces are in parallelism with the side faces of the slot and so that the disc is properly centered within the slot. The gage for accomplishing these functions forms the subject matter of a separate application to be filed.

It is also important that the spaced mounting surfaces 25 and 25a of the mounting pad 18 be checked for parallelism with reference to a central plane drawn through the brake disc 22 in order that appropriate shims 26 may be provided to correct any non-parallelism.

Referring now to the figures of the drawings which disclose the gage, such gage may include front and rear body members 30 and 31 respectively which when anchored together form the main body of the gage. The front body member is provided with a tapered slot 32 extending throughout its length and body member 31 is likewise provided with a tapered slot 33 extending throughout its length. A clamp plate 34 shaped as a wedge is received in the tapered body slot 32 and a similar plate 35 is received in body slot 33. At the upper end of each clamp plate notches 36 and 37 are provided and the lower end of adjustment screw 38 is provided with a diametrically enlarged circular head 39 received in the chamber provided by notches 36 and 37. A cap 40 is anchored to the body members 30 and 31 and is internally threaded to receive the threaded shank 41 of the adjustment screw. A knob 42 is anchored to the upper end of the shank and when rotated causes the wedge shaped clamp plates to move simultaneously up or down so as to cause the inner faces of said plates to move closer together or further apart as desired. Thus when mounting the gage on the disc 22 as best shown in FIGURES 1 and 2, the adjustment screw can be rotated to cause the clamp plates to move downwardly relative to the body members, thus opening the clamp plates enough so that they are easily mounted on the disc. Then the adjustment screw is rotated in the opposite direction until the clamp plates are snugly engaged with the disc.

The body members are provided with elongated slots 44 and 45 through which the bolts 46 and 47 project, said bolts being threaded one into each clamp plate. Each bolt is provided with a bearing assembly comprised of two washers and an elastic biscuit 48 intermediate the washers. Thus the clamp plates are resiliently drawn into snug engagement with their corresponding body members while being manipulated up or down relative to same. When the gage is mounted on the disc, a pair of spaced stops 50 and 51 are provided for the periphery of the disc to bear against.

At the back side of body member 31 and at either end thereof are a pair of arms 53 and 54 mounted for rocking movement about the axis of pivot bearings 55. Bifurcated brackets 56 are anchored at either end of the body member 31 for carrying the arms 53 and 54. The lower end of each arm has a button 57 which engages the respective mounting surfaces 25 and 25a of mounting pad 18. The upper end 58 of each arm engages the head 59 of each of the plungers of a pair of conventional dial indicator assemblies 60. The casings 61 of such assemblies are secured to body member 31 by the bolts 62. Thus when the gage is mounted on the disc 22 as in FIGURE 1, the two dial indicators will reflect any non-parallelism between the disc and mounting pad 18 and will also reflect the distance from the center plane of the disc to the mounting surfaces 25 and 25a.

We claim:
1. A gage for indicating the parallelism or non-parallelism of a rotative disc with reference to the mounting surface of a stationary support for the disc, comprising:
(a) a body with a chamber having oppositely disposed converging side walls;

(b) opposed clamp plates each having an inclined wall coacting with a chamber side wall;

(c) means carried on the body for actuating the clamp plates toward each other into engagement with the opposite faces of the disc;

(d) arms pivotally mounted on the body and spaced from each other and having their lower ends engageable with the mounting surface of the disc support at spaced locations thereon;

(e) indicating means carried on the body and responsive to the movement of the upper ends of the arms for reflecting the positions of the lower ends of the arms with reference to the positions of the clamp plates.

2. A gage as set forth in claim 1 wherein the means carried on the body for actuating the clamp plates engages said plates for moving them up and down relative to the body, thereby effecting a simultaneous transverse movement of the clamp plates toward or away from each other, whereby to engage the opposite faces of the disc.

3. A gage as set forth in claim 2 wherein the clamp plates have oppositely disposed recesses therein and the means for engaging the clamp plates includes a stud threadedly engaged with the body and a radially enlarged flange on the stud and received in the clamp plate recesses for effecting up and down movement of the clamp plates as the stud is rotated.

4. A gage as set forth in claim 2 wherein stops with arcuate under surfaces are mounted on the body on opposite sides of the clamp plates and are engageable with the periphery of the disc.

5. A gage for indicating the parallelism or non-parallelism of a rotative disc with reference to the mounting surface of a stationary support for the disc as set forth in claim 2 wherein resilient means are secured to each clamp plate and engage the body for maintaining the inclined walls of the clamp plates in engagement with the converging side walls of the body chamber.

6. A gage as set forth in claim 5 wherein the clamp plates have elongated slots therein and the resilient means include studs projecting through the slots and secured at their inner ends to the clamp plates and having radially enlarged, axially compressible washer assemblies on their outer ends for sliding engagement with the outer walls of the body.

References Cited

UNITED STATES PATENTS

| | | | |
|---|---|---|---|
| 1,510,819 | 10/1924 | Barth | 33—203.19 |
| 1,996,323 | 4/1935 | Chase et al. | 33—180 |
| 3,214,838 | 11/1965 | Skundberg | 33—172 |

WILLIAM D. MARTIN, Jr., *Primary Examiner.*